United States Patent [19]
Thorn

[11] 3,772,191

[45] Nov. 13, 1973

[54] METHOD OF DIGESTING AND FURTHER PROCESSING FRESH SEWAGE SLUDGE OR SOPROPEL

[76] Inventor: Werner Thorn, Kuchucksberg 13, Lutjensee, Germany

[22] Filed: Apr. 26, 1971

[21] Appl. No.: 137,536

[30] Foreign Application Priority Data
Apr. 25, 1970  Germany ................... P 20 20 304.7

[52] U.S. Cl .......................... 210/44, 210/10, 210/51
[51] Int. Cl ............................................... C02c 3/00
[58] Field of Search .................. 210/10, 18, 42, 44, 210/48, 51

[56] References Cited
UNITED STATES PATENTS
| | | | |
|---|---|---|---|
| 3,649,534 | 3/1972 | Schotte | 210/10 X |
| 3,440,165 | 4/1969 | Davis et al. | 210/10 X |
| 2,300,693 | 11/1942 | Oswald | 210/42 |
| 2,852,584 | 9/1958 | Komline | 210/10 X |
| 1,430,182 | 9/1922 | Peck | 210/44 |

OTHER PUBLICATIONS
Wilson, J. A., et al., "The Role of Acidity in the Dehydration of Sewage Sludge," J. Ind. & Eng. Chem. 13:406, May, 1921.

*Primary Examiner*—Samih N. Zaharna
*Assistant Examiner*—Thomas G. Wyse
*Attorney*—Beaman & Beaman

[57] ABSTRACT

The method of treating sewage wherein the sludge is acidified with a mineral acid to a pH value just below 5 and then the pH value is adjusted to the isoelectrical range of the high molecular sludge substances by addition of hydrochloric acid. The floated hydrophobic substances are removed from the surface and the precipitated sludge substances are separated from the supernatent liquid. The precipitated sludge is mixed with calcium hydroxyde or calcium oxyde and dehydrated in a filter presse to a water content of 50 to 30 percent by weight. This process is less expensive than prior art processes and allows a faster sludge dehydration than up to now.

9 Claims, 2 Drawing Figures

Patented Nov. 13, 1973

3,772,191

INVENTOR
Werner Thorn
BY
Beaman & Beaman
Attys

METHOD OF DIGESTING AND FURTHER PROCESSING FRESH SEWAGE SLUDGE OR SOPROPEL

BACKGROUND OF THE INVENTION

The invention relates to a method of digesting, thickening and dehydrating fresh sludges and putrid sludges (sapropels). The municipal waste waters and those from industries are passed to sewage treatment plants where they are purified by the removal of substances contaminating the water, the coarse particles being retained by a trash rack and the sediments obtained as fresh sludge being used after treatment in a sapropel tower as fertilizers or at the highest as fuel material, or are destroyed in another way. The purified water is used by the industries, seeps into the ground, or is passed into rivers. Apart from special treatment plants which are provided for individual industrial works, waste waters of different origins are re-conditioned in these sewage treatment plants. Therefore, fresh sludges containing different amounts of substances of biological origin and of very heterogeneous compositions are obtained which have a water content of about 98 percent. The fresh sludges are subjected to the microbial treatment in sapropel towers; in this treatment part of the organic substances are decomposed and at the same time a considerable homogenization of the sludge and a concentration of solid content to as a rule 5 to 10 percent maximum are obtained.

The sapropels formed by microbial action are a mixture of low and high molecular substances with hydrophilic and hydrophobic properties, stabilized by the inherent metabolism of the microorganisms. A further thickening of the sapropels within a reasonably short period of time has been possible so far only at relatively high expenses for chemicals (precipitants) and/or for thermal energy in costly plants. A thickening of the sapropel in drying beds saves costs, however, it requires time and large areas.

The storing of sapropel on drying beds with a retention time of several months is difficult because of expanding suburbs and the continuously increasing water requirements. The sinking of the sapropels into abandoned mines which is practiced in certain places, may be considered as an emergency; it is somewhat unsafe because of the uncontrolled subterranean accumulations of methane. The introduction of unclear waste waters, fresh sludges and sapropels into rivers and even in regions of brackish water as, for instance, into the mouths of the rivers Elbe and Weser, will no longer be compatible with the requirements of water economy and with the measures to be taken to prevent the contamination of coasts and beaches. Besides the acute mud load, the decreasing seeping capacity caused by the formation of water-insoluble films in the regions of river beds constitutes a constantly increasing danger to potable water supply. The supervision of wells in the neighbourhood of rivers the reservoir of which is supplemented by the seepage capacity, has brought to light that even if certain distances of safety between well and river are maintained typical waste water derivatives will arrive in the well water.

It is the object of the invention to provide a process by which a thickening and dehydration of the fresh sludges and sapropels in the highest possible degree may be obtained in a substantially shorter period of time than with other processes. With the new process, both the initial costs of the plant and the current expenses for the operation are to be lower than with prior art processes.

SUMMARY OF THE INVENTION

The problem is solved by a process of digesting and further processing fresh sludge and/or sapropel which is characterized by acidifying the pumpable fresh sludge and/or sapropel of predominantly biological original in a reaction vessel which mineral acid until the pH value has fallen below 5 and the mixture begins to separate; fine adjustment of the pH value with fuming hydrochloric acid to the isoelectric ranges of the most high-molecular sludge substances of biological original thereby completely separating the mixture; removing the hydrophobic substances which have accumulated in the upper part of the vessel; separating the precipitated sludge substances from the supernatent liquid; reacting them with $Ca(OH)_2$ in substance or in the form of lime milk or with quick-lime ($CaO$); and dehydrating them in filter presses.

In a special embodiment of the invention, fuming hydrochloric acid is used both for acidifying and for the fine adjustment of the pH value. The acidification may also be carried out with hydrochloric acid containing 3 to 35 percent by weight hydrogen chloride. In an especially preferred embodiment of the invention, the sludge or sapropel is acidified with 20 to 98 percent by weight sulphuric acid, preferably with crude concentrated sulfuric acid. The sludge substances separated from the supernatent liquid are mixed with 10 to 30 kg $Ca(OH)_2$ per $m^3$ of thickened sludge having a solids content of about 20 percent, and the water content is removed in dependence upon the sludge temperature and the composition of the sludge in filter presses down to 50 to 30 percent by weight water. Sapropel having a low to medium content of lipides may be mixed with 15 to 30 $Kg/m^3$ $Ca(OH)_2$ without previous separation of the mixture by acid treatment and may be directly dehydrated in filter presses to a water content of 50 to 30 percent. It has been found to be especially advantageous to have oxygen or compressed air bubble through the sapropel before it is acidified.

In accordance with the invention sapropels are thus digested and thickened and subsequently further dehydrated.

It has now unexpectedly been found that by adding mineral acids to the fresh sludges and sapropels in such an extent that the pH value is reduced to a level of below 5 the hydrophobic substances, i.e., lipides, fatty acids, higher hydrocarbons and the like may be separated from the mixture by floating quantitatively and may be gathered at the surface of the liquid charge. Among the hydrophilic components the high-molecular substances having basic groups comprising proteins, proteides such as nucleo, glyco, phosphoproteides, and furthermore nucleic acids etc., are precipitated simultaneously and will sink to the vessel bottom together with other sludge components. This process step is designated as digestion and thickening.

Apart from this, it has been found that especially by the addition of fuming hydrochloric acid the isoelectric range of the most protein particles is adjusted and at the same time the metabolism of the microorganisms is stopped by means of the hydrogen chloride and gaseous chlorine dissolved in this acid by killing the microorganisms. The acidification of the sludges for separating the mixture may be performed with any mineral acid. What is decisive for successful precipitation, especially for the killing of the microorganisms and thus for the digestion of the sludge is the addition of fuming hydrochloric acid. A combination of fuming hydrochloric acid with crude sulphuric acid has proved to be most economical. Crude concentrated sulphuric acid is added to the sapropels for the purpose of eliminating the buffer capacity of the high molecular substances, predominantly the proteins, and then the fuming hydrochloric acid is added to adjust the pH value in order to obtain a complete elimination and a precipitation of the proteins.

Using the above described process one has succeeded in thickening all the samples of sapropel from the most various towns of the Federal Republic of Germany to a solids content of 20 to 24 percent within a few days. It was possible to remove 66 to 83 percent maximum of the charged volume in the form as a relatively clear supernatent liquid from the residual thickened solids material. This will be seen from the examples shown below.

In accordance with the invention the above described dehydration effect obtained when using fuming hydrochloric acid may still be enhanced and accelerated, if oxygen or compressed air is bubbled through the reaction vessel filled with sapropel before the acid treatment is performed. In this way, the sensitivity of the anaerobes to oxygen is exploited and the anaerobic metabolism processes are braked.

With the previously described process steps one obtains a thickened but still pumpeable sapropel which, due to stoppage of the metabolism of the microorganisms proves to be very stable and uniform in its properties. The digestion of the sapropel with separating the hydrophobic substances, removal of 66 to roughly 80 percent of the liquid volume and concentration of the solids content to 20 to 24 percent maximum, when using the above described process, is obtained in a simple manner.

Not only a thickening but also a possibly complete dehydration of the sapropels is provided with the invention; the centrifuging process which is often employed for the dehydration of aqueous materials is not suited for thickened sapropels because only a poor separation of phases will occur. Filter presses have been used up to now only to dry sapropel with a high content of carbon dust and other undissolved specifically heavy particles. With the normal sapropels it is possible to build-up filter cakes, but water may be withdrawn only with difficulty and with a considerable waste of time. It has now been found that the formation of a filter cake having a water content of 50 to 30 percent is possible in routine work by the addition of calcium hydroxide (Ca(OH)$_2$), lime milk, calcium oxide (CaO, quick-lime) and, in a limited extent, by the addition of calcium carbonate (CaCO$_3$, chalk).

It has furthermore been found that after the addition of powdered calcium hydroxide the thickened sapropel but also well-putrided sludges having a medium to moderate content of lipides without acid treatment become directly filterable with low sludge temperatures, which is an effect that cannot be obtained with quicklime in the tested temperature range from 0° to 20° C. The filtrability and the amounts of calcium hydroxide to be used are largely dependent on the acid content of the thickened sapropel, which acid has been used to thicken the sapropel, and on the content of fuming hydrochloric acid which has been used to stabilize the sludge. The last mentioned process step constitutes the solution to the problem posed by the sapropels which cannot be primarily filtrated, said process steps solving this problem in a simpler, safer and more economic way than was possible with the previously usual processes.

With the aid of simple chemicals (fuming hydrochloric acid, crude sulphuric acid) 1 m$^3$ sapropel having a solids content of 5 percent is reduced to a volume of roughly 300 l sapropel having a solids content of roughly 20 percent. With addition of calcium hydroxide which is likewise available in large amounts as a cheap chemical, the water content is reduced by using a filter press to such an extent that pressed cakes with a water content of 50 to 30 percent will be obtained at the end of the filter process.

The process is in the first place suitable for sewage treatment plants in which municipal waste waters are purified. But it is also applicable to special purification plants of indistrial waste water and may be employed to special advantage in plants to purify waste waters of slaughterhouses, fish and meat industries, canned food industries, dairies and the like, which have a high centent of high-molecular substances of biological origin containing basic groups, i.e., protein substances.

ECONOMICAL CONSIDERATIONS WITH RESPECT TO THE METHOD OF THE INVENTION

The solids contents of the fresh sludge samples tested were between 2.0 and 3.0 percent by weight, those of the sapropel samples between just under 4.0 and 7.5 percent by weight. The values were determined using the freeze-drying method and comprise also all the dissolved sludge conponents.

Acid consumption per m$^3$ for digesting and thickening (A) and solids content are only approximately running in parallel, the acid consumption per m$^3$ is dependent on the number of microorganisms, the protein content and the content of further amphoteric substances.

For solids contents of roughly 5 percent directly after withdrawal from the sapropel tower 160 to 180 acid equivalents are needed per m$^3$ sludge to adjust a pH value of 4.5 to 4.0. 1 l of fuming hydrochloric acid contains roughly 10 equivalents and costs at present 12 Pfennigs if large quantities are bought. If A) is performed using hydrochloric acid, accordingly, costs in the amount of 1.92 to 2.16 DM would be caused per m$^3$. 1 l of crude concentrated sulphuric acid contains roughly 36 equivalents and costs at present roughly 20 Pfennigs if large quantities are bought. If A) is performed using sulphuric acid to adjust a pH value of 4.5 to 4, analoguously to the above, costs in the amount of only 0.90 to 1.00 DM would be caused per m$^3$.

It is recommendable because of the longer lasting stoppage of the metabolism of microorganisms and because of the filtrability to use the following combination: 3.5 to 4.0 l sulphuric acid and 5 to 3 l hydrochloric acid.

After sedimentation, the sapropel thickened to roughly 20 to 24 percent maximum solids content is mixed with 10 to 20 kg of calcium hydroxide per m$^3$ (thickened sludge!) and is dehydrated in filter presses. A metric ton of pulverous lime (Ca(OH)$_2$) at the present time costs roughly 50, — DM. Calculated on the sapropel having a solids content of 5 percent by weight costs in the amount of 20 to 30 Pfennigs will again have to be incurred. The costs of direct filtration without acid treatment calculated on the sapropel having a solids content of 5 percent by weight, are between 0.80 and 1.50 DM.

The overall costs of chemicals for the separation of roughly 900 l of water are about 1.50 DM, which is roughly 25 to 30 percent of the costs of chemicals for other processes or only 20 percent of the costs which have to be spent on thermal sapropel dehydration, with comparatively much lower plant investment costs.

The process was successfully tested also with samples derived from thickening systems and drying beds with an initial solids content of 12 to 14 percent. Well pudrided sludges with low lipide contents were charged directly into filter presses without any acid treatment after an amount of calcium hydroxide had been added (15 to 30 kg/m$^3$). Solids filter cakes were obtained also in this way with a water content of 50 to 30 percent.

BRIEF DESCRIPTION OF THE DRAWING

In the following, the step sequence of the process will be explained in more detail by way of an example from which the effectiveness of the process for digesting and thickening sludges may be clearly seen in connection with the drawing, which shows in FIG. 1 and 2 the disintegration of two different sludge samples at a time 4 hours after the acid treatment.

EXAMPLE 1

A sample taken from the Stellinger Moor having a solids content of 5.0 percent was treated as follows:

Oxygen was caused to bubble through the sample and then the sample was mixed with 165 acid equivalents/m$^3$ sapropel. The following table shows the settling speed, determined on 1,020 ml sapropel in a 1,000 ml cylinder:

| Time | Beginning | 45 min. | after 2 hrs 25 min. | 40 min. | 48 hrs. |
|---|---|---|---|---|---|
| Sediment Limit (ml) | 0 | 300 | 190 | 180 | 120 |

The lipide foam layer and the supernatent liquid accounted for 81.5 percent of the overall volume after 48 hours.

EXAMPLE 2

Figure 1:
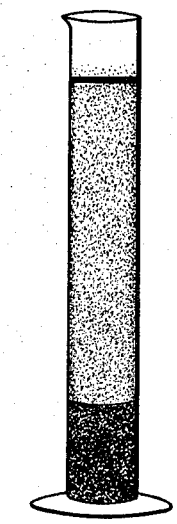
Figure 2:
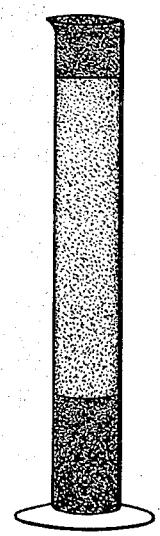

Two sapropel samples were subjected to the acid treatment according to the invention. The sample shown in FIG. 1 was taken from a sewage treatment plant mainly processing municipal waste waters, the sample shown in FIG. 2 was taken from a sewage treatment plant in which municipal and industrial waste waters are treated. The drawing represents the condition of the samples 4 hours after acid treatment.

What I claim is:

1. A method of processing pumpable putrid or fresh sewage sludge of predominantly biological origin obtained from municipal and/or industrial sewage, comprising the steps of acidifying the sludge with mineral acids to a pH value below 5, separating the sludge by gravity in a vessel into an upper floating hydrophobic surface layer, an intermediate layer of supernatent liquid, and a lower layer of precipitated sludge substances, removing the floated hydrophobic substances from the surface of the supernatent liquid, separating the precipitated sludge substances from the supernatent liquid, mixing the precipitated sludge substances with a basic chemical selected from the group consisting of calcium hydroxide and calcium oxide in an amount of 10 to 30 kg Ca(OH)$_2$ per m$^3$ sludge, said basic chemical being present in an amount effective to promote substantially the reduction of the water content of the precipitated sludge substances in a filter press, and dehydrating this mixture in a filter press.

2. A method of processing pumpable putrid or fresh sewage sludge as in claim 1, wherein the pH value is adjusted to the isoelectric range of most of the high molecular substances of biological origin contained in the sludge.

3. A method of processing pumpable putrid or fresh sewage sludge as in claim 1, wherein the sludge is acidified by addition of hydrochloric acid preferably of concentrations containing 3 to 35 percent by weight hydrogen chloride.

4. A method of processing pumpable putrid or fresh sewage sludge as in claim 1, wherein the sludge is acidified by addition of sulphuric acid preferably of concentrations containing 20 to 98 percent by weight H$_2$SO$_4$.

5. A method of processing pumpable putrid or fresh sewage sludge as in claim 1, wherein the sludge is acidified by addition of crude concentrated sulphuric acid.

6. A method of processing pumpable putrid or fresh sewage sludge as in claim 1, wherein the mixture of precipitated sludge and basic chemical is dehydrated down to a water content of 50 to 30 percent by weight.

7. A method of processing pumpable putrid or fresh sewage sludge as in claim 1, wherein the sludge has an oxygen containing gas bubbled therethrough before being acidified.

8. A method of processing pumpable putrid or fresh sewage sludge as in claim 1, wherein the sludge is acidifed by addition of fuming hydrochloric acid.

9. A method of processing pumpable putrid or fresh sewage sludge as in claim 2, wherein final fine adjustment of the pH is effected by means of fuming hydrochloric acid.

* * * * *